US010029322B2

(12) United States Patent
Van Wambeke et al.

(10) Patent No.: US 10,029,322 B2
(45) Date of Patent: Jul. 24, 2018

(54) HOUSING OF A CUTTING TOOL INCLUDING BLADE STORAGE, INTEGRAL BLADE GUARD AND MOTOR VENTILATION PATHWAY

(75) Inventors: Weston J. Van Wambeke, Towson, MD (US); Christopher G. Donze, Towson, MD (US); Ashok S. Baskar, Lutherville, MD (US)

(73) Assignee: BLACK & DECKER INC., New Britan, CT (US)

( * ) Notice: Subject to any disclaimer, the term of this patent is extended or adjusted under 35 U.S.C. 154(b) by 2526 days.

(21) Appl. No.: 11/859,261

(22) Filed: Sep. 21, 2007

(65) Prior Publication Data

US 2009/0077818 A1 Mar. 26, 2009

(51) Int. Cl.
| | |
|---|---|
| B23D 49/16 | (2006.01) |
| B23D 51/02 | (2006.01) |
| B25F 5/02 | (2006.01) |
| B27G 19/00 | (2006.01) |
| B23D 51/03 | (2006.01) |
| B25F 5/00 | (2006.01) |

(52) U.S. Cl.
CPC .......... *B23D 51/03* (2013.01); *B23D 49/162* (2013.01); *B23D 51/02* (2013.01); *B25F 5/008* (2013.01); *B25F 5/029* (2013.01); *B27G 19/006* (2013.01)

(58) Field of Classification Search
CPC ...... B23D 49/162; B23D 51/02; B23D 51/03; B23Q 13/00; B25F 5/008; B25F 5/029; B27G 19/006
USPC ......... 30/124, 125, 392–394; 81/177.7, 490; 206/350
See application file for complete search history.

(56) References Cited

U.S. PATENT DOCUMENTS

| | | | |
|---|---|---|---|
| 1,102,018 | A | 6/1914 | Dodds |
| 2,377,673 | A | 6/1945 | Chaddock |
| 2,543,486 | A | 2/1951 | Briskin |
| 2,623,557 | A | 12/1952 | Kendall |
| 2,749,951 | A | 6/1956 | Tetzner |

(Continued)

FOREIGN PATENT DOCUMENTS

| | | |
|---|---|---|
| DE | 716 266 | 1/1942 |
| DE | 1 760 076 | 1/1958 |

(Continued)

OTHER PUBLICATIONS

Extended European Search Report for European Patent Application No. 08164643.2 dated Mar. 10, 2011 (7 pages).

(Continued)

*Primary Examiner* — Clark F Dexter
(74) *Attorney, Agent, or Firm* — Stephen R. Valancius

(57) ABSTRACT

A jigsaw that uses a cutting blade generally includes a housing containing a motor activated by a trigger assembly. A blade storage compartment is recessed in the housing. A platform is provided in the blade storage compartment having a first edge that at least partially defines a first recess that extends further into the housing beyond the platform. A member is connected to the platform that produces a magnetic field that releasably secures the cutting blade to the platform. The magnetic field is configured to permit a user to tilt the cutting blade about the first edge of the platform into the first recess to overcome the magnetic field and remove the cutting blade from the storage compartment.

20 Claims, 10 Drawing Sheets

(56) References Cited

U.S. PATENT DOCUMENTS

| | | |
|---|---|---|
| 2,775,272 A | 12/1956 | Papworth |
| 2,819,742 A | 1/1958 | Blachly |
| 2,916,062 A | 12/1959 | Clauson |
| 2,934,106 A | 4/1960 | Chapman et al. |
| 3,087,519 A | 4/1963 | McCarty et al. |
| 3,093,773 A | 6/1963 | Cole |
| 3,109,465 A | 11/1963 | Smith |
| 3,116,768 A | 1/1964 | Lasar |
| 3,131,736 A | 5/1964 | Ristow et al. |
| 3,146,809 A | 9/1964 | Botefuhr |
| 3,353,573 A | 11/1967 | Hitzeroth |
| 3,374,814 A | 3/1968 | Kaufmann |
| 3,388,728 A | 6/1968 | Riley, Jr. et al. |
| 3,456,698 A | 7/1969 | Csaki |
| 3,457,796 A | 7/1969 | Leach et al. |
| 3,461,732 A | 8/1969 | Gregory |
| 3,478,786 A | 11/1969 | Hendrickson |
| 3,486,610 A * | 12/1969 | Hain et al. .................... 206/372 |
| 3,542,097 A | 11/1970 | Dudek |
| 3,805,383 A | 4/1974 | McNally |
| 3,834,019 A | 9/1974 | Smeltzer et al. |
| 3,938,251 A | 2/1976 | Kareman |
| 3,969,796 A | 7/1976 | Hodsdon et al. |
| 3,973,324 A | 8/1976 | Persson |
| 4,090,297 A | 5/1978 | Wanner et al. |
| 4,137,632 A | 2/1979 | Pfanzer |
| 4,191,917 A | 3/1980 | Brown et al. |
| 4,213,242 A | 7/1980 | Partington |
| 4,238,884 A | 12/1980 | Walton, II |
| 4,240,204 A | 12/1980 | Walton, II et al. |
| 4,250,624 A | 2/1981 | Partington |
| 4,255,006 A | 3/1981 | King |
| 4,255,858 A | 3/1981 | Getts |
| 4,257,297 A | 3/1981 | Nidbella |
| 4,262,421 A | 4/1981 | Bergler et al. |
| 4,272,889 A | 6/1981 | Scott et al. |
| 4,283,855 A | 8/1981 | Nalley |
| 4,351,112 A | 9/1982 | Nalley |
| 4,377,003 A | 3/1983 | Abe et al. |
| 4,545,123 A | 10/1985 | Hartmann |
| 4,614,037 A | 9/1986 | Somers |
| 4,628,459 A | 12/1986 | Shinohara et al. |
| 4,628,605 A | 12/1986 | Clowers |
| 4,636,961 A | 1/1987 | Bauer |
| 4,665,617 A | 5/1987 | Maier et al. |
| 4,675,999 A | 6/1987 | Ito et al. |
| 4,693,009 A | 9/1987 | Bone |
| 4,730,397 A | 3/1988 | Weiford et al. |
| 4,833,782 A | 5/1989 | Smith |
| 4,837,935 A | 6/1989 | Maier et al. |
| 4,932,294 A | 6/1990 | Chang |
| 4,962,681 A | 10/1990 | Yang |
| 4,969,830 A | 11/1990 | Daly et al. |
| 4,973,205 A | 11/1990 | Spaulding |
| 5,010,652 A | 4/1991 | Miletich |
| 5,012,583 A | 5/1991 | Blochle et al. |
| 5,038,481 A | 8/1991 | Smith |
| 5,119,705 A | 6/1992 | Rosenberger et al. |
| 5,205,043 A | 4/1993 | Batt et al. |
| 5,208,525 A | 5/1993 | Lopic et al. |
| 5,273,462 A | 12/1993 | Huser et al. |
| 5,279,037 A | 1/1994 | Leatherman |
| 5,445,479 A | 8/1995 | Hillinger |
| 5,535,437 A | 7/1996 | Karl et al. |
| 5,549,145 A | 8/1996 | Bearden |
| 5,617,638 A | 4/1997 | Amano et al. |
| 5,644,845 A | 7/1997 | Durr et al. |
| 5,644,846 A | 7/1997 | Durr et al. |
| 5,644,847 A | 7/1997 | Odendahl et al. |
| 5,675,899 A | 10/1997 | Webb |
| 5,680,704 A | 10/1997 | Okubo et al. |
| 5,716,730 A | 2/1998 | Deguchi |
| 5,727,322 A | 3/1998 | Giacometti |
| 5,778,538 A | 7/1998 | Gentinetta et al. |
| 5,784,800 A | 7/1998 | Santhouse et al. |
| 5,813,805 A | 9/1998 | Kopras |
| D404,274 S | 1/1999 | Ogasawara et al. |
| 5,902,080 A | 5/1999 | Kopras |
| 5,996,460 A | 12/1999 | Waite |
| 6,017,242 A | 1/2000 | Kerrigan |
| 6,021,826 A | 2/2000 | Daniell |
| D423,314 S | 4/2000 | Robson |
| 6,157,545 A | 12/2000 | Janninck et al. |
| 6,178,646 B1 | 1/2001 | Schnell et al. |
| 6,189,217 B1 | 2/2001 | Melvin et al. |
| D440,474 S | 4/2001 | Heun |
| 6,220,888 B1 | 4/2001 | Correa |
| 6,230,411 B1 | 5/2001 | Wall et al. |
| D446,703 S | 8/2001 | Netzler |
| 6,305,089 B1 | 10/2001 | Berndt |
| 6,334,743 B1 | 1/2002 | Liao |
| 6,357,123 B1 | 3/2002 | Manuel |
| 6,357,124 B1 | 3/2002 | Wall et al. |
| 6,397,717 B1 | 6/2002 | Waite |
| 6,412,181 B1 | 7/2002 | Pracas |
| 6,443,675 B1 | 9/2002 | Kopras et al. |
| 6,449,851 B1 | 9/2002 | Bone et al. |
| D463,963 S | 10/2002 | Metaxatos |
| 6,484,409 B2 | 11/2002 | Campbell et al. |
| 6,510,772 B2 | 1/2003 | Brickner, Jr. et al. |
| 6,553,642 B2 | 4/2003 | Driessen |
| 6,553,675 B2 | 4/2003 | Orrico |
| D474,384 S | 5/2003 | Andriolo |
| D476,871 S | 7/2003 | Santarsiero et al. |
| 6,625,892 B2 | 9/2003 | Takahashi et al. |
| D486,711 S | 2/2004 | Tam et al. |
| 6,691,417 B2 | 2/2004 | Campbell et al. |
| 6,705,017 B2 | 3/2004 | Ellis et al. |
| D489,239 S | 5/2004 | Keller |
| 6,755,107 B2 | 6/2004 | Peot et al. |
| 6,769,188 B2 | 8/2004 | Dorner et al. |
| 6,877,234 B2 | 4/2005 | Saegesser et al. |
| 6,890,135 B2 | 5/2005 | Kopras et al. |
| 6,892,459 B2 | 5/2005 | Okumura et al. |
| 6,902,356 B2 | 6/2005 | Breitenmoser |
| 6,912,788 B2 | 7/2005 | Tam et al. |
| 6,920,694 B2 | 7/2005 | Hecht et al. |
| D519,014 S | 4/2006 | Aglassinger |
| D519,346 S | 4/2006 | Wu |
| D519,804 S | 5/2006 | Wu |
| D519,805 S | 5/2006 | Ng |
| D519,806 S | 5/2006 | Waldron |
| D520,318 S | 5/2006 | Waldron |
| D521,335 S | 5/2006 | Parel et al. |
| D521,834 S | 5/2006 | Andriolo et al. |
| D522,335 S | 6/2006 | Houghton |
| D523,309 S | 6/2006 | Schmid |
| D523,311 S | 6/2006 | Welsh et al. |
| 7,065,884 B2 | 6/2006 | Tam et al. |
| D524,621 S | 7/2006 | Wu |
| D524,622 S | 7/2006 | Corcoran |
| D525,098 S | 7/2006 | Taniguchi et al. |
| 7,094,011 B2 | 8/2006 | Kopras et al. |
| 7,111,405 B2 | 9/2006 | Delfini et al. |
| D532,664 S | 11/2006 | Wu |
| 7,131,180 B2 | 11/2006 | Kopras et al. |
| 7,131,206 B2 | 11/2006 | Wu |
| 7,152,329 B2 | 12/2006 | Kondo et al. |
| 7,234,243 B2 | 6/2007 | Tam et al. |
| D560,455 S | 1/2008 | Yamamoto et al. |
| 7,328,514 B2 | 2/2008 | Park |
| D566,504 S | 4/2008 | Hayakawa et al. |
| D572,555 S | 7/2008 | Baumgaertner |
| 7,503,121 B2 | 3/2009 | Powell et al. |
| 7,509,744 B2 | 3/2009 | Walker |
| 7,513,047 B2 | 4/2009 | Wu |
| 7,526,867 B2 | 5/2009 | Park |
| 7,562,457 B2 * | 7/2009 | Prieto ............................ 30/392 |
| 2002/0131267 A1 | 9/2002 | Van Osenbruggen |
| 2002/0197123 A1 | 12/2002 | Kopras et al. |
| 2003/0000355 A1 | 1/2003 | Butler et al. |
| 2003/0121389 A1 * | 7/2003 | Wheeler et al. ........... 83/699.21 |
| 2003/0140507 A1 * | 7/2003 | Lagaly et al. ....... B23D 49/162 30/392 |

(56) References Cited

U.S. PATENT DOCUMENTS

| | | |
|---|---|---|
| 2003/0145472 A1 | 8/2003 | Swift |
| 2003/0167641 A1 | 9/2003 | Teng |
| 2003/0196338 A1 | 10/2003 | Eto et al. |
| 2003/0233921 A1 | 12/2003 | Garcia et al. |
| 2004/0040161 A1 | 3/2004 | Houben et al. |
| 2004/0049927 A1 | 3/2004 | Wu |
| 2004/0112187 A1 | 6/2004 | Chen et al. |
| 2004/0128843 A1 | 7/2004 | Walker |
| 2004/0168561 A1 | 9/2004 | Tam et al. |
| 2004/0261274 A1 | 12/2004 | Tam et al. |
| 2005/0050896 A1 | 3/2005 | Park |
| 2005/0060896 A1 | 3/2005 | Park |
| 2005/0195592 A1 | 9/2005 | Hsu et al. |
| 2005/0217448 A1 | 10/2005 | Walker |
| 2005/0223571 A1 | 10/2005 | Park et al. |
| 2005/0229408 A1 | 10/2005 | Ngan et al. |
| 2005/0252007 A1 | 11/2005 | Critelli et al. |
| 2005/0257383 A1 | 11/2005 | Million |
| 2005/0257384 A1 | 11/2005 | Million |
| 2005/0257385 A1 | 11/2005 | Walker |
| 2005/0262707 A1 | 12/2005 | Wu |
| 2005/0283984 A1 | 12/2005 | Walmsley |
| 2006/0064882 A1 | 3/2006 | Wilson et al. |
| 2006/0080850 A1 | 4/2006 | Firth |
| 2006/0090355 A1 | 5/2006 | Di Nicolantonio |
| 2006/0101969 A1 | 5/2006 | Garcia et al. |
| 2006/0104732 A1 | 5/2006 | Huang |
| 2006/0117580 A1 | 6/2006 | Serdynski et al. |
| 2006/0143928 A1 | 7/2006 | Wu |
| 2006/0168824 A1 | 8/2006 | Roberts |
| 2006/0185173 A1 | 8/2006 | Wadge et al. |
| 2006/0191140 A1 | 8/2006 | Wadge et al. |
| 2006/0196059 A1 | 9/2006 | Berto |
| 2006/0288592 A1 | 12/2006 | Roberts |
| 2007/0059114 A1 | 3/2007 | Grimes, II |
| 2007/0068012 A1 | 3/2007 | Chen |
| 2007/0101586 A1 | 5/2007 | Felder et al. |
| 2007/0180711 A1 | 8/2007 | Park |
| 2007/0186425 A1 | 8/2007 | Tam et al. |
| 2007/0289148 A1 | 12/2007 | Zhang et al. |
| 2008/0222901 A1 | 9/2008 | Kaiser et al. |
| 2008/0229589 A1 | 9/2008 | Bone |
| 2008/0244910 A1 | 10/2008 | Patel |
| 2009/0313831 A1 | 12/2009 | Patel |

FOREIGN PATENT DOCUMENTS

| | | |
|---|---|---|
| DE | 1 795 934 | 9/1959 |
| DE | 1 628 899 | 8/1971 |
| DE | 23 03 532 | 8/1974 |
| DE | 24 35 845 | 2/1976 |
| DE | 26 50 470 | 5/1978 |
| DE | 80 33 115 | 5/1981 |
| DE | 30 21 801 | 12/1981 |
| DE | 31 18758 | 12/1982 |
| DE | 32 22 426 | 12/1983 |
| DE | 3403762 A1 | 8/1985 |
| DE | 34 08 847 | 11/1985 |
| DE | 34 46 278 | 6/1986 |
| DE | 35 43 764 | 6/1986 |
| DE | 35 09 515 | 9/1986 |
| DE | 8507818 U1 | 2/1987 |
| DE | 36 08 301 | 9/1987 |
| DE | G 88 08 046 U1 | 10/1988 |
| DE | 35 46 547 | 5/1989 |
| DE | 3906643 A1 | 9/1990 |
| DE | 35 46 700 | 10/1990 |
| DE | 39 21 891 | 1/1991 |
| DE | 40 27 135 | 3/1992 |
| DE | G 93 07 337 | 8/1993 |
| DE | 93 13 712 | 12/1993 |
| DE | 43 20 233 | 6/1994 |
| DE | 43 16 155 | 11/1994 |
| DE | 195 13 078 | 10/1996 |
| DE | 196 04 938 | 2/1997 |
| DE | 296 15 634 U | 4/1997 |
| DE | 196 09 388 | 9/1997 |
| DE | 29910173 U1 | 9/1999 |
| DE | 199 26 387 | 12/2000 |
| DE | 201 20 529 U | 4/2002 |
| DE | 102 15 871 | 10/2003 |
| DE | 202 20 893 U | 6/2004 |
| DE | 10 2004 042 025 | 3/2006 |
| DE | 102004043564 | 3/2006 |
| DE | 20 2006 004 715 U | 6/2006 |
| DE | 102004 063 174 | 7/2006 |
| DE | 102005025934 | 12/2006 |
| DE | 102006005410 A1 | 8/2007 |
| EP | 0 347 631 | 12/1989 |
| EP | 0 504 745 | 9/1992 |
| EP | 0 521 263 | 1/1993 |
| EP | 0 603 552 | 6/1994 |
| EP | 0 716 897 | 6/1996 |
| EP | 0 716 898 | 6/1996 |
| EP | 0 736 353 | 10/1996 |
| EP | 0 826 453 | 3/1998 |
| EP | 0 967 040 B1 | 12/1999 |
| EP | 0 970 771 | 1/2000 |
| EP | 1 188 505 | 3/2002 |
| EP | 1 328 369 | 4/2002 |
| EP | 1 258 305 | 11/2002 |
| EP | 1 001 866 B1 | 3/2004 |
| EP | 1 586 399 | 10/2005 |
| EP | 102004051350 | 4/2006 |
| EP | 1 658 936 | 5/2006 |
| EP | 1 679 144 | 7/2006 |
| EP | 1 437 203 B1 | 12/2006 |
| EP | 1 595 631 B1 | 2/2007 |
| GB | 221671 A | 9/1924 |
| GB | 2075421 A | 11/1981 |
| GB | 2300145 A | 10/1996 |
| GB | 2 310 905 | 9/1997 |
| GB | 2 330 328 | 4/1999 |
| GB | 2 336 805 | 11/1999 |
| GB | 2 337 228 | 11/1999 |
| GB | 2 399 314 | 9/2004 |
| GB | 2 399 315 | 9/2004 |
| GB | 2 406 071 | 3/2005 |
| JP | 2000 343309 | 12/2000 |
| JP | 2002 337102 | 11/2002 |
| WO | WO 8605427 | 9/1986 |
| WO | WO-9902310 A2 | 1/1999 |
| WO | WO 02/22297 | 3/2002 |
| WO | WO-0232608 A1 | 4/2002 |
| WO | WO/02/057042 | 7/2002 |
| WO | WO 03/106087 | 12/2003 |

OTHER PUBLICATIONS

Communication from the European Patent Office dated Aug. 9, 2011 regarding European Application No. 08164641.6.

\* cited by examiner

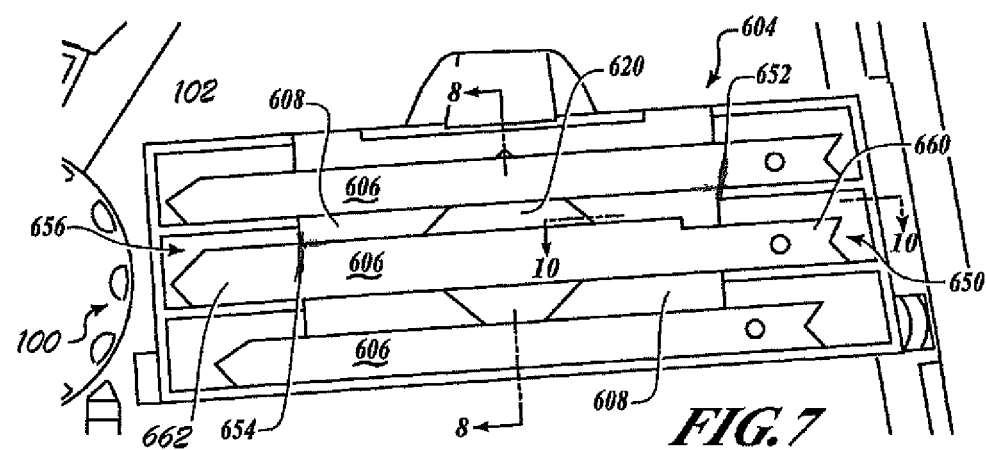
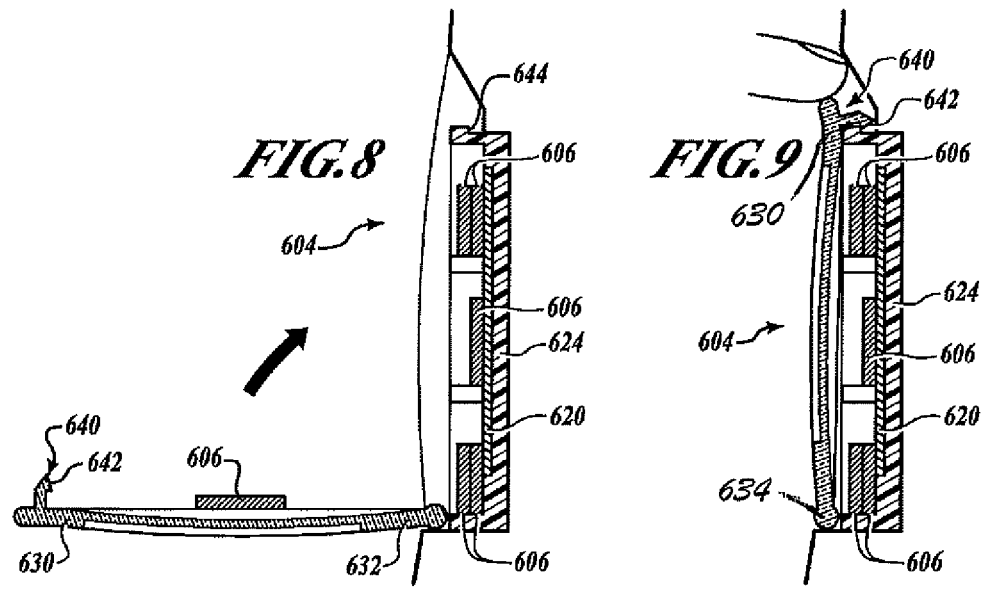
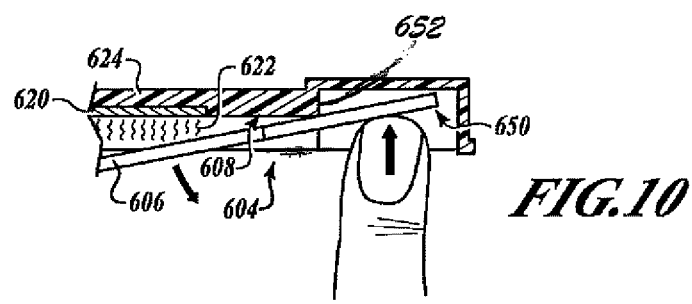

HOUSING OF A CUTTING TOOL INCLUDING BLADE STORAGE, INTEGRAL BLADE GUARD AND MOTOR VENTILATION PATHWAY

FIELD

The present teachings relate to a housing of a cutting tool and more particularly relate to a blade storage compartment, a blade guard and an additional motor ventilation pathway through a cord protector in the housing of the cutting tool.

BACKGROUND

Typically, a jigsaw blade is replaceable, as the blade can wear and break. Multiple blades can be carried to provide replacements for worn or broken blades and to provide additional blades for other tasks that can require, for example, a different tooth profile and a different blade length.

Users may have to carry blades in separate containers and bring these blades along with the jigsaw. Having to carry the jigsaw blades in separate and sometimes bulky containers may not always provide the user with the jigsaw blade needed for replacement or for a different application.

SUMMARY

The present teachings generally include a jigsaw that uses a cutting blade. The jigsaw generally includes a housing containing a motor activated by a trigger assembly. A blade storage compartment is recessed in the housing. A platform is provided in the blade storage compartment having a first edge that at least partially defines a first recess that extends further into the housing beyond the platform. A member is connected to the platform that produces a magnetic field that releasably secures the cutting blade to the platform. The magnetic field is configured to permit a user to tilt the cutting blade about the first edge of the platform into the first recess to overcome the magnetic field and remove the cutting blade from the storage compartment.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 7 is a partial side view of the blade storage compartment with a cover open in accordance with the present teachings.

FIG. 8 is a partial cross-sectional view of the blade storage compartment of FIG. 7 showing one or more members that can provide a magnetic field to hold the cutting blades within the blade storage compartment in accordance with the present teachings.

FIG. 9 is a partial cross-sectional view of the blade storage compartment showing a locking member that can secure the cover to the blade storage compartment in accordance with the present teachings.

FIG. 10 is a partial cross-sectional view of the blade storage compartment showing a user tilting the cutting blade into a recess to remove the cutting blade from the blade storage compartment in accordance with the present teachings.

DETAILED DESCRIPTION

Figure 1:
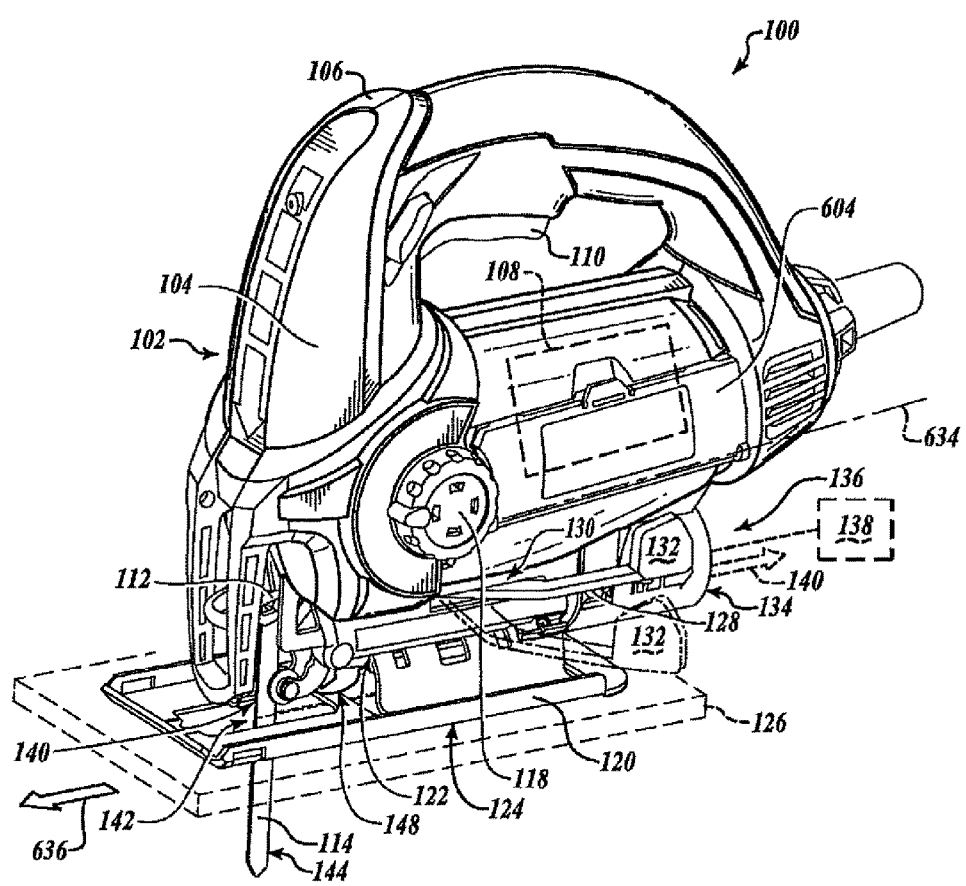
FIG. 1 is a perspective view of an example of a jigsaw having a blade storage container contained within a housing of the jigsaw and an integral blade guard member that extends from the fascias coupled to the housing in accordance with the present teachings. The jigsaw also includes dust extraction from a cutting area, through the housing and out of a vacuum port.

The following description is merely exemplary in nature and is not intended to limit the present teachings, their application or uses. It should be understood that throughout the drawings, corresponding reference numerals can indicate like or corresponding parts and features.

Moreover, certain terminology can be used for the purpose of reference only and do not limit the present teachings. For example, terms such as "upper," "lower," "above" and "below" can refer to directions in the drawings to which reference is made. Terms such as "front," "back," "rear" and "side" can describe the orientation of portions of the component, function, system, etc. within a consistent but arbitrary frame of reference which can be made more clear by reference to the text and the associated drawings describing the component, function, system, etc. under discussion. Such terminology may include the words specifically mentioned above, derivatives thereof and words of similar import. Similarly, the terms "first," "second" and other such numerical terms referring to structures, systems and/or methods do not imply a sequence or order unless clearly indicated by the context.

Figure 6:
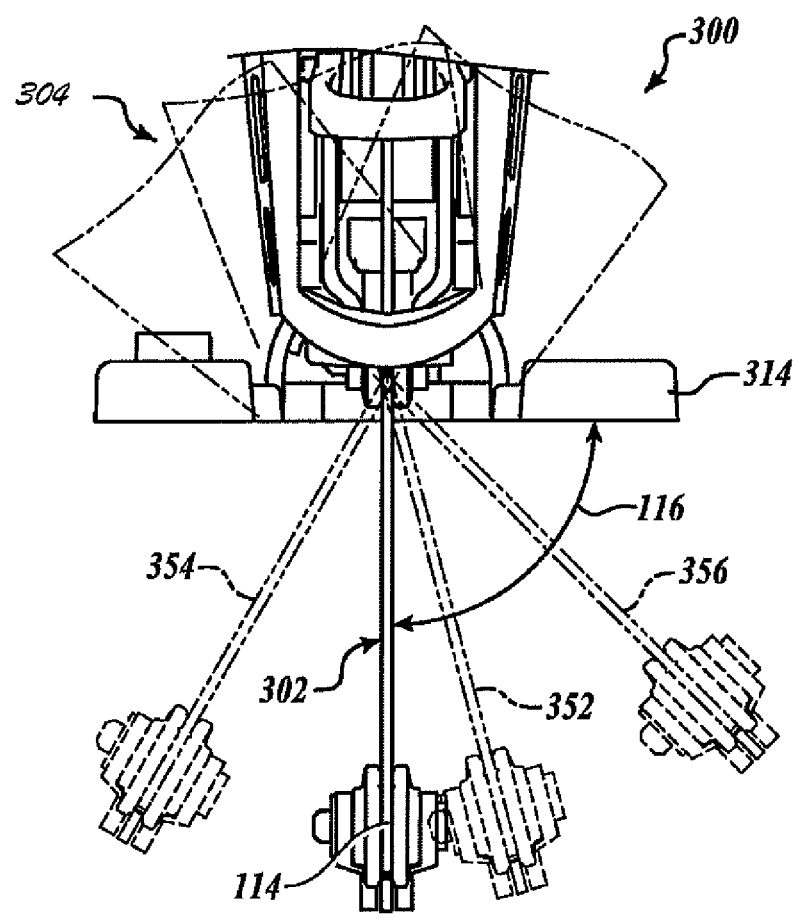
FIG. 6 is a front view of the jigsaw of FIG. 3 showing the laser module attached to the housing that can be pivoted relative to a shoe member in accordance with the present teachings.

With reference to FIG. 1, a jigsaw 100 generally includes a housing 102 that can be formed of two half shells 104, 106. The housing 102 can contain a motor 108. When activated by a trigger assembly 110, the motor 108 can provide a reciprocating and/or an orbital (pendulum) motion to a conventional combination of a cutting blade holder 112 on an end of a reciprocating shaft (not shown) to drive a cutting blade 114 at a cutting angle 116 (FIG. 6). A single control member 118 on a side of the housing 102 can control a rate of reciprocation and/or a magnitude of the orbital motion of the cutting blade 114.

A shoe member 120 can be coupled to a bottom 122 of the housing 102 in such a way as to permit the shoe member 120 to pivot relative to the housing 102. As the shoe member 120 pivots relative to the housing 102, the cutting blade 114 can be orientated at various angles (i.e., one or more of the cutting angles 116 (FIG. 6)) relative to the shoe member 120.

A bottom surface 124 of the shoe member 120 can abut a workpiece 126, which can be wood, plastic, metal, other suitable materials and one or more combinations thereof and can be in the form of pipe, sheet material, stock material, other suitable forms and/or materials and one or more combinations thereof. The shoe member 120 can be pivoted relative to the housing 102 to adjust the cutting angle 116 (FIG. 6) of the jigsaw 100, e.g., at a forty-five degree cutting angle. As the shoe member 120 is moved relative to the housing 102, an angle indicator wheel 128 can indicate the cutting angle 116 of the jigsaw 100.

Further, a locking mechanism 130 can include a bevel lever 132 that can be adjusted between an unlocked condition (phantom line) and a locked condition, as shown in FIG. 1. In the unlocked condition, the locking mechanism 130 can permit the shoe member 120 to pivot relative to the housing 102. In the locked condition, the locking mechanism 130 can prevent the shoe member 120 from pivoting relative to the housing 102. In this regard, the cutting angle 116 (FIG. 6) to which the shoe member 120 can be pivoted relative to the housing 102, when the locking mechanism 130 is in the unlocked condition, can be indicated by the angle indicator wheel 128.

A dust extraction port 134 can be formed on a rear portion 136 of the housing 102 such that a vacuum source 138 can be connected with various suitable connections to the dust extraction port 134. A dust extraction airflow 140 can be extracted from a cutting area 142. From the cutting area 142, the dust extraction airflow 140 can move into the housing 102 near a rear edge 144 of the cutting blade 114, through an airflow pathway in the housing 102 and out through the dust extraction port 134.

The dust extraction airflow 140 can travel through the airflow pathway in the housing 102 and can be routed through an inner periphery of the angle indicator wheel 128. The dust extraction airflow 140 can also exit the cutting area 142 through a scoop member 148 that extends from the housing 102. In the above examples, the shoe member 120 can be pivoted relative to the housing 102 (FIG. 6) without interrupting the dust extraction airflow 140 through the housing 102 and through the angle indicator wheel 128.

Figure 2:
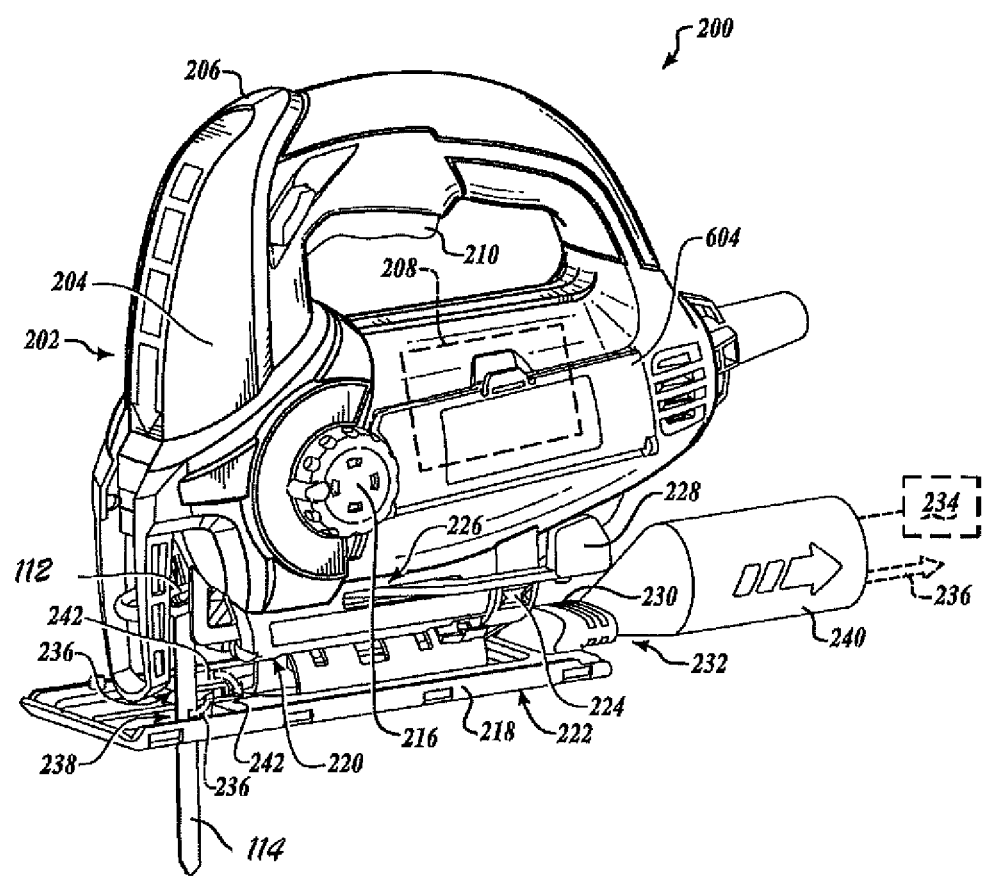
FIG. 2 is a perspective view of another example of a jigsaw similar to the jigsaw of FIG. 1 that includes dust extraction from a cutting area, through a shoe member and out of a vacuum port that extends from the shoe member in accordance with the present teachings.

With reference to FIG. 2, a jigsaw 200 includes a housing 202 that can be formed of two half shells 204, 206. The housing 202 can contain a motor 208. When activated by a trigger assembly 210, the motor 208 can provide the reciprocating and/or the orbital (pendulum) motion to the reciprocating shaft to drive a cutting blade 114 at one or more of the cutting angles 116 (FIG. 6). A single control member 216 on a side of the housing 202 can control the rate of reciprocation and/or the magnitude of the orbital motion of the cutting blade 114.

A shoe member 218 can be coupled to a bottom 220 of the housing 202 in such a way as to permit the shoe member 218 to pivot relative to the housing 202. As the shoe member 218 pivots relative to the housing 202, the cutting blade 114 can be orientated at the various cutting angles 116 (FIG. 6) relative to the shoe member 218. A bottom surface 222 of the shoe member 218 can abut the workpiece 126 (FIG. 1).

As the shoe member 218 is moved relative to the housing 202, an angle indicator wheel 224 can indicate the cutting angle 116 (FIG. 6) of the jigsaw 200. Further, a locking mechanism 226 can include a bevel lever 228 that can be adjusted between an unlocked condition and a locked condition. The cutting angle 116 (FIG. 6) to which the shoe member 218 can be pivoted relative to the housing 202, when the locking mechanism 226 is in the unlocked condition, can be indicated by the angle indicator wheel 224.

A dust extraction port 230 can be formed on a rear portion 232 of the shoe member 218, in contrast to the dust extraction airflow 140 through the housing 102 (FIG. 1). A vacuum source 234 can be connected to the dust extraction port 230. A dust extraction airflow 236 can be extracted from a cutting area 238. From the cutting area 238, the dust extraction airflow 236 can move through an airflow pathway in the shoe member 218 and out through the dust extraction port 230 that extends therefrom. A vacuum source adapter 240 can be connected to the dust extraction port 230 formed in the shoe member 218 and can be used to connect to the vacuum source 234. Inlets 242 can be formed at one or more locations on the shoe member 218 adjacent the cutting area 238. From the inlets 242, the dust extraction airflow 236 can be routed through channels in the shoe member 218 to the dust extraction port 230.

Figure 3:
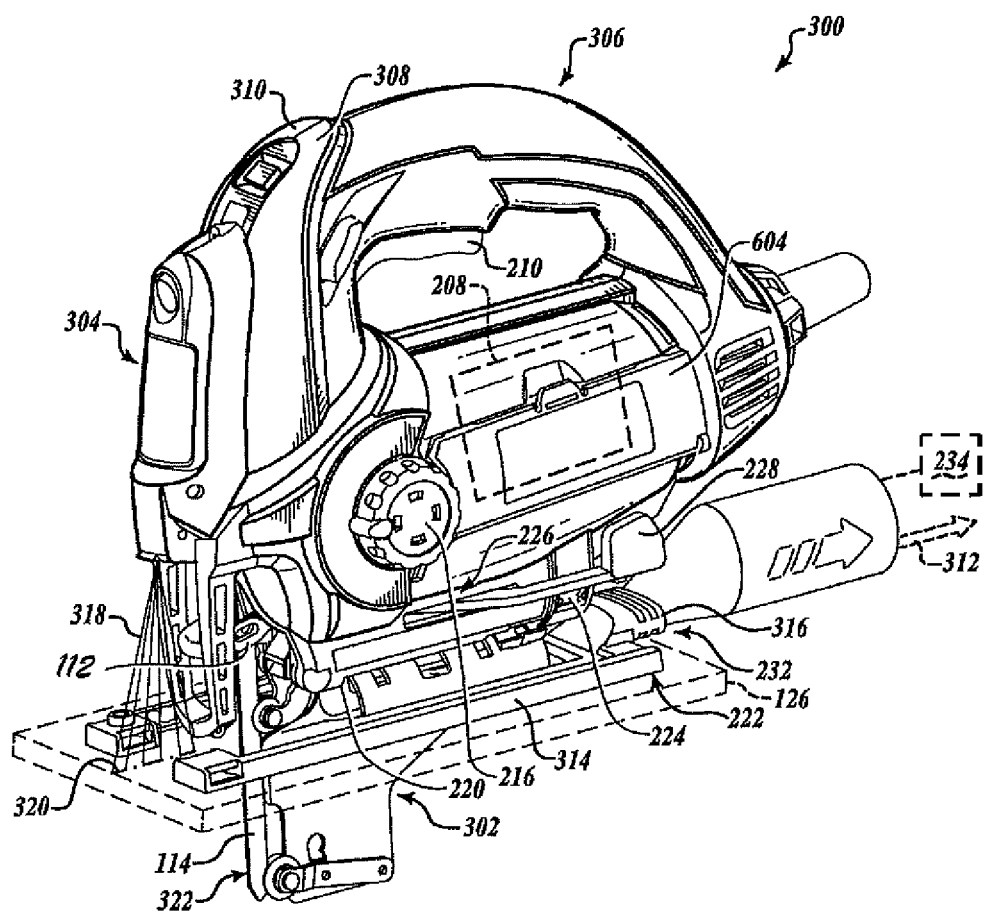
FIG. 3 is a perspective view of a further example of a jigsaw similar to the jigsaw illustrated in FIG. 2 including a laser module connected to a front of the housing of the jigsaw in accordance with the present teachings.

With reference to FIG. 3, a jigsaw 300 can be similar to the exemplary jigsaw 200 (FIG. 2) and can also include a keel assembly 302 and/or a laser module 304 that can be connected to a housing 306 having two housing half shells 308, 310 implemented in a similar fashion to the jigsaw 200. The jigsaw 300 can further include a dust extraction airflow 312 through a shoe member 314. The dust extraction airflow 312 can exit from a dust extraction port 316 that can extend therefrom. The laser module 304 can project a laser light 318 and can produce a laser light pattern 320. The laser light pattern 320 can produce, for example, a sequence of dashes and/or dots beyond a front side 322 of the cutting blade 114 and can highlight a path of the cutting blade 114 through the workpiece 126.

The keel assembly 302 can provide additional straight-line accuracy when cutting a straight line in the workpiece 126 (e.g., can help avoid wandering of the jigsaw cutting line). The keel assembly 302 can be pivoted with the housing 306 when the shoe member 314 is moved at an angle (i.e., one or more cutting angles 116 (FIG. 6)) relative to the housing 306. In this regard, the shoe member 314 can be pivoted relative to the housing 306 but the keel assembly 302 can remain generally in line with the housing 306 so as to provide, for example, a straight bevel cut through the workpiece 126.

Figure 4:
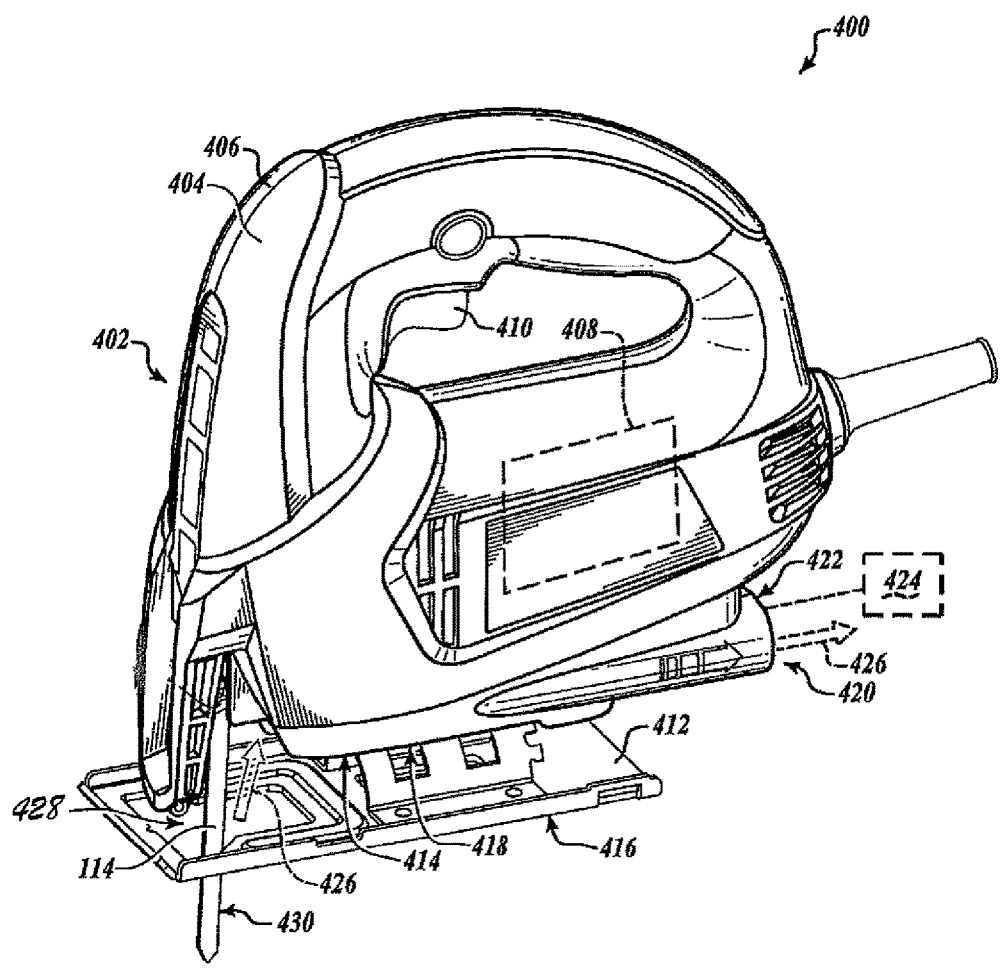
FIG. 4 is a perspective view of yet another example of a jigsaw having a blade guard that is an integral extension from the housing half shells in accordance with the present teachings.

With reference to FIG. 4, a jigsaw 400 includes a housing 402 that can be formed of two half shells 404, 406. The housing 402 can contain a motor 408. When activated by a trigger assembly 410, the motor 408 can provide a reciprocating and/or pendulum motion to the reciprocating shaft to drive the cutting blade 114 at one of the cutting angles 116 (FIG. 6).

A shoe member 412 can be coupled to a bottom 414 of the housing 402 in such a way as to permit the shoe member 412 to pivot relative to the housing 402. As the shoe member 412 pivots relative to the housing 402, the cutting blade 114, can be orientated at various angles (i.e., one or more of the cutting angles 116 (FIG. 6)) relative to the shoe member 412. As is known in the art, a bottom surface 416 of the shoe member 412 can abut the workpiece 126 (FIG. 1).

A locking mechanism 418 can be adjusted between an unlocked condition that can permit the shoe member 412 to pivot relative to the housing 402 and a locked condition that can prevent the shoe member 412 from pivoting relative to the housing 402. In one example, the locking mechanism 418 can include one or more fasteners (not shown) that can secure the shoe member 412 to the bottom 414 of the housing 402. The fasteners can be partially removed to permit the shoe member 412 to pivot relative to the housing 402.

A dust extraction port 420 can be formed on a rear portion 422 of the housing 402 such that a vacuum source 424 can be connected to the dust extraction port 420. A dust extraction airflow 426 can be extracted from a cutting area 428. From the cutting area 428, the dust extraction airflow 426 can move into the housing 402 near a rear side 430 of a cutting blade 114, through an airflow pathway in the housing 402 and out through the dust extraction port 420.

Figure 5:
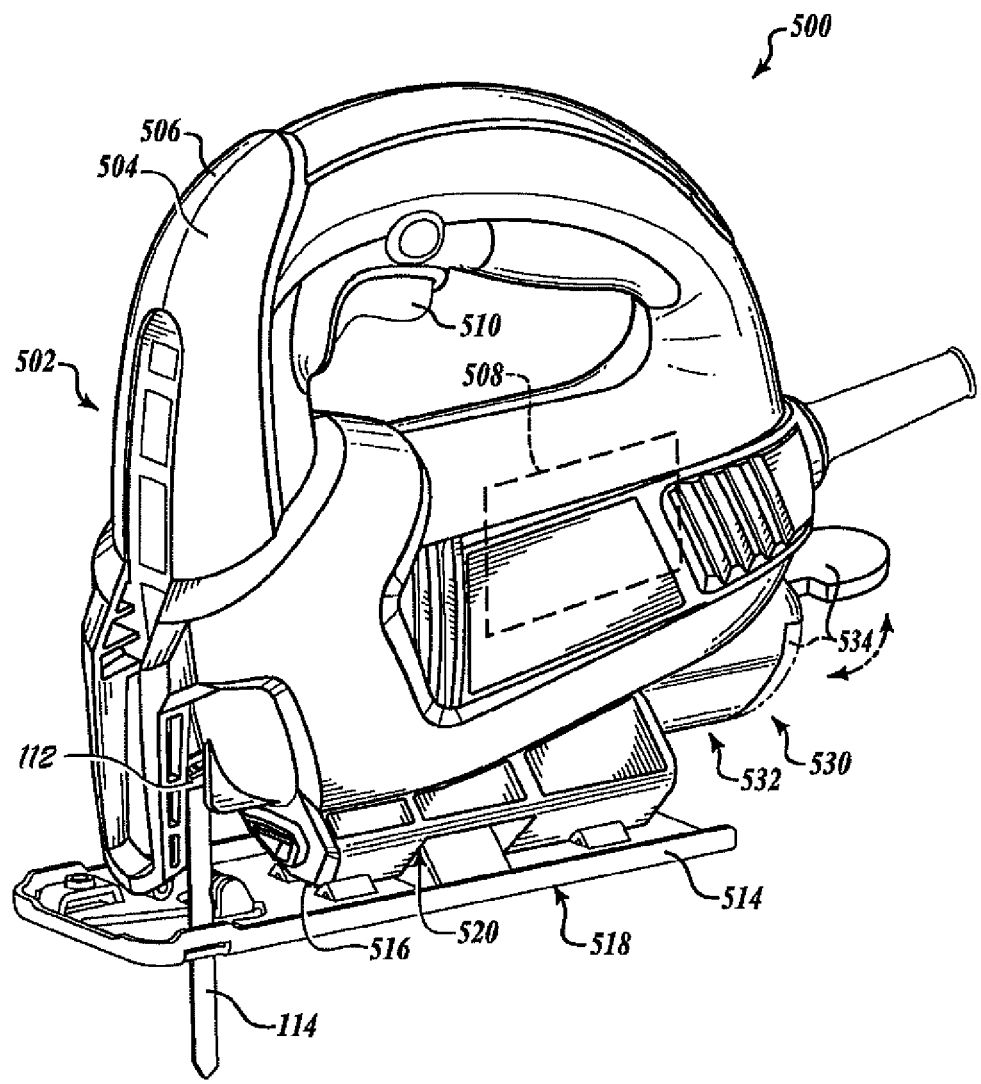
FIG. 5 is a perspective view of a further example of a jigsaw similar to the jigsaw of FIG. 4 including a storage compartment formed in the housing in accordance with the present teachings.

With reference to FIG. 5, a jigsaw 500 generally includes a housing 502 that can be formed of two half shells 504, 506. The housing 502 can contain a motor 508. When activated by a trigger assembly 510, the motor 508 can provide a reciprocating and/or pendulum motion to the reciprocating shaft to drive the cutting blade 114 at one or more of the cutting angles 116 (FIG. 6).

A shoe member 514 can be coupled to a bottom 516 of the housing 502 in such a way as to permit the shoe member 514 to pivot relative to the housing 502 in a fashion that is similar to the jigsaw 400 (FIG. 4). A bottom surface 518 of the shoe member 514 can abut the workpiece 126 (FIG. 1). In addition, a locking mechanism 520 can be adjusted between an unlocked condition that can permit the shoe member 514 to pivot relative to the housing 502 and a locked condition that can prevent the shoe member 514 from pivoting relative to the housing 502. The locking mechanism 520 can include one or more fasteners (not shown) that can secure the shoe member 514 to the bottom 516 of the housing 502. The fasteners can be partially removed (i.e., the unlocked condition) to permit the shoe member 514 to pivot relative to the housing 502.

A storage container 530 can be formed on a rear portion 532 of the housing 502 such that blades, tools, etc. can be stored within the storage container 530. A storage container cover 534, illustrated in an open condition, can be closed (shown in phantom line) to contain whatever may be placed within the storage container 530.

With reference to FIG. 6, the cutting angle 116 of the cutting blade 114 of the jigsaw 300 is shown relative to the shoe member 314 of the jigsaw 300. The keel assembly 302 is also attached to the housing 306. The cutting angle 116 can be positioned at the zero degree cutting angle, i.e., a perpendicular cutting angle relative to the shoe member 314. The cutting angle 116 can also be positioned at one or more cutting angles such as a cutting angle 352 (phantom line) that can be positioned at about positive fifteen degrees, while a cutting angle 354 (phantom line) can be positioned at about negative thirty degrees. A cutting angle 356 (phantom line) can be positioned at about positive forty five degrees. It will be appreciated in light of the disclosure that "positive," in this example, only refers to being on one side of the zero degree (perpendicular) cutting angle orientation and thus "negative" refers to the other side. It will also be appreciated in light of the disclosure that various cutting angles can be implemented with any of the jigsaws 100, 200, 300, 400, 500 (FIGS. 1-5).

With reference to FIG. 7, a housing 600 of a jigsaw 602 can provide a blade storage compartment 604 that can contain one or more cutting blades 606 to be used with the jigsaw 602. The blade storage compartment 604 can define one or more platforms 608 on which each of the cutting blades 606 for the jigsaw 602 can be stored. It will be appreciated in light of the disclosure that the blade storage compartment 604 can be implemented within the housing of various power tools. For example, the blade storage compartment 604 can be implemented on the housing 102, 202, 302, 402, 502 of the jigsaw 100, 200, 300, 400, 500, respectively. Moreover, the blade storage compartment 604 can be implemented in one or both of the half shells 104, 106, 204, 206, 304, 306, 404, 406, 504, 506 of the housing 100, 200, 300, 400, 500, respectively.

One or more members 620 that can emit a magnetic field 622 can be connected to the blade storage compartment 604. The one or more members 620 that provide the magnetic field 622 can be secured to a side 624 of the blade storage compartment 604. In one example, the one or more members 620 can be exposed to the blade storage compartment 604 and can be in an area accessible by the user. In other examples, the one or more members 620 can be contained within a wall of the blade storage compartment 604 and, therefore, cannot be in an area accessible by the user. The one or more members 620 can include one or more magnets and/or any such material or device that can provide the one or more magnetic fields 622.

A cover 630 of the blade storage compartment 604 can be hinged at one end 632. In this arrangement, the cover 630 can open or close about an axis of rotation 634 that is generally parallel to a cutting direction 636 (FIG. 1) of the jigsaw 602. As such, the cover 630 can swing downward and, in this arrangement, the cover 630 can be configured to catch anything that might fall from the blade storage compartment 604. In other arrangements, the cover 630 can swing upward. In further configurations, the cover 630 can be hinged to open in other directions such as a sideways open and closed configuration.

With reference to FIGS. 8 and 9, the cover 630 of the blade storage compartment 604 can include a locking member 640 that can be deflected by hand so the user can open the blade storage compartment 604 without the need for tools. The locking member 640 can keep the cover 630 of the blade storage compartment 604 closed during use of the jigsaw 602 by holding onto a portion of the blade storage compartment 604. The user can insert, for example, a finger to flex the locking member 640 so as to lift a flange 642 out of engagement (or at least out of an interfering path) with a surface 644 (FIG. 8) of the blade storage compartment 604 or the housing 602. By doing so, the locking member 640 can no longer prevent the opening of the cover 630.

In some examples, the cover 630 of the blade storage compartment 604 can be translucent or transparent to provide the user with the ability to determine what is contained within the blade storage compartment without opening the cover 630. The cover 630 of the blade storage compartment 604 can be configured so as to continue the general contours of the housing 600 of the jigsaw 602. In this regard, when the cover 630 of the blade storage compartment 604 is closed, the contours of the housing 600 and the cover 630 appear to be generally uniform in the area of the blade storage compartment 604.

With reference to FIG. 7, the blade storage compartment 604 can be formed with one or more recesses at one or both edges of the platform 608 that can hold the cutting blades 606. With reference to FIG. 10, a first recess 650 can be formed at a first edge 652 of the platform 608. With reference to FIG. 7 and at a second edge 654 of the platform 608, a second recess 656 can be formed in the blade storage compartment 604. The first recess 650 and the second recess 656 can be configured so that the respective ends of the cutting blades 606 can be pressed into the recess 650, 656. By pressing the one or more blades 606 into the first recess 650, one or more of the cutting blades 606 can be tilted about an edge 652, 654 of the platform 608 so as to tilt the other end of the blade 608 out of and away from the blade storage compartments 604.

When the second end of the cutting blade 606 is tilted outward from the blade storage compartment 604, the user can grasp that end of the cutting blade 606 and remove it from the blade storage compartment 604. Moreover, the one or more members 620 can provide the magnetic field 622 that can retain the one or more cutting blades 606 in the blade storage compartment 604 using a magnetic force established by the magnetic field 622. As the user presses a first end 660 of the cutting blade 606 into the first recess 650 (or into the second recess 656), the one or more cutting blades 606 can tilt on the first edge 652 (or on the second edge 654) of the blade storage compartment 604 to overcome a force of the magnetic field 622. In doing so, the user can tilt a second end 662 of the cutting blade 606 (about the first edge 652) out of the blade storage compartment 604.

While the second end 662 is tilted out from the blade storage compartment 604, the magnetic field 622 can still exert sufficient force to retain the one or more cutting blades 606 in position. In this regard, the cutting blades 606 do not completely overcome the magnetic field 622 when tilted but are still sufficiently held in place until ultimate removal from the blade storage compartment 604. It will be appreciated in light of the disclosure that the blade storage compartment 604 can be configured with one platform between two recess or multiple platforms each between two recesses.

Figure 11:
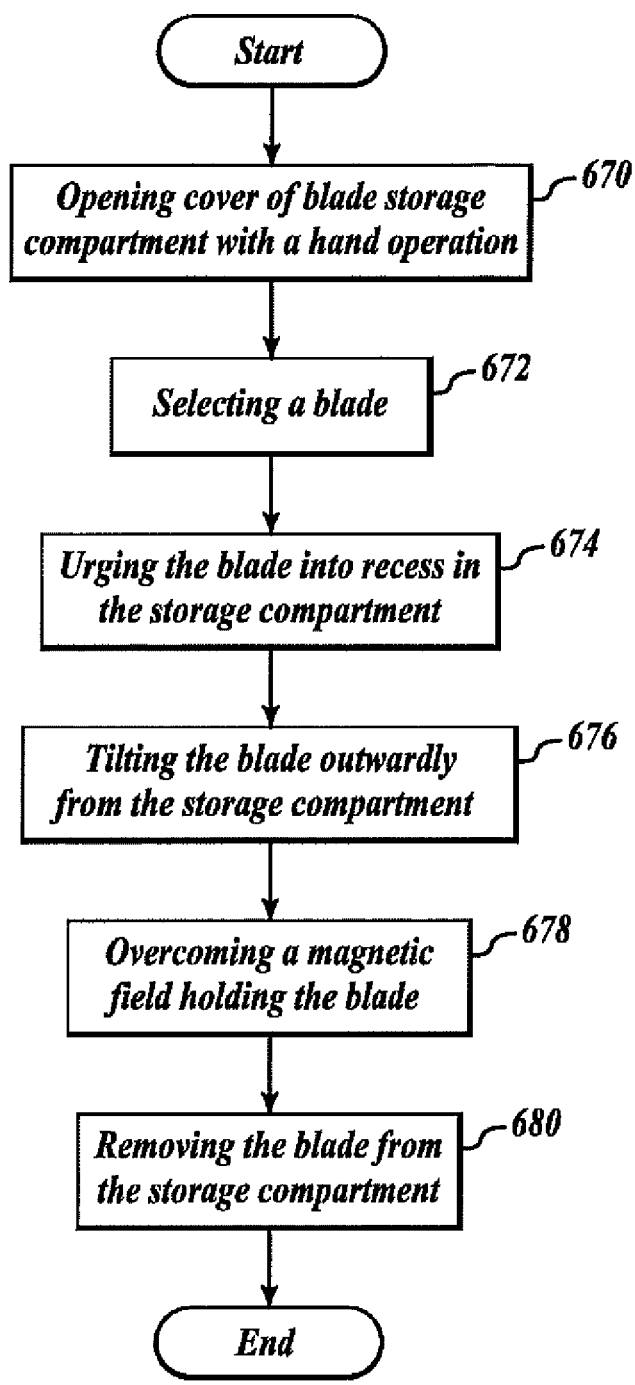
FIG. 11 is a flow chart showing an exemplary method of removing the cutting blades from the blade storage compartment in accordance with the present teachings.

With reference to FIG. 11, an exemplary method of obtaining one of the cutting blades 606 from the blade storage compartment 604 generally includes opening the cover 630 of the blade storage compartment 604 with a one-handed operation at 670. At 672, the user can select a blade. At 674, the user can urge an end of one or more of the cutting blades 606 into the first recess 650 (or the second recess 656) provided adjacent to the platform 608 in which one or more of the cutting blades 606 reside in the blade storage compartment 604.

At 676, the user can tilt the one or more cutting blades 606 into the recess 650, 656 so as to tilt the opposite side (i.e., the second side 662) of the cutting blade 606, as applicable, out from the platform 608. At 678, the cutting blade 606 can be tilted outward from the platform 608 to overcome the magnetic field 622 that can keep the cutting blade 606 in contact with the platform 608. At 680, the user can remove the one or more cutting blades 606 from the platform 608. From 680, the exemplary method can end. It will be appreciated in light of the disclosure that the cutting blade 606 can be removed from the blade storage compartment 604 and can necessarily overcome the magnetic field 622 of the member 620 without tilting the one or more cutting blades 606 about the edge of either the first recess or the second recess.

Figure 12:
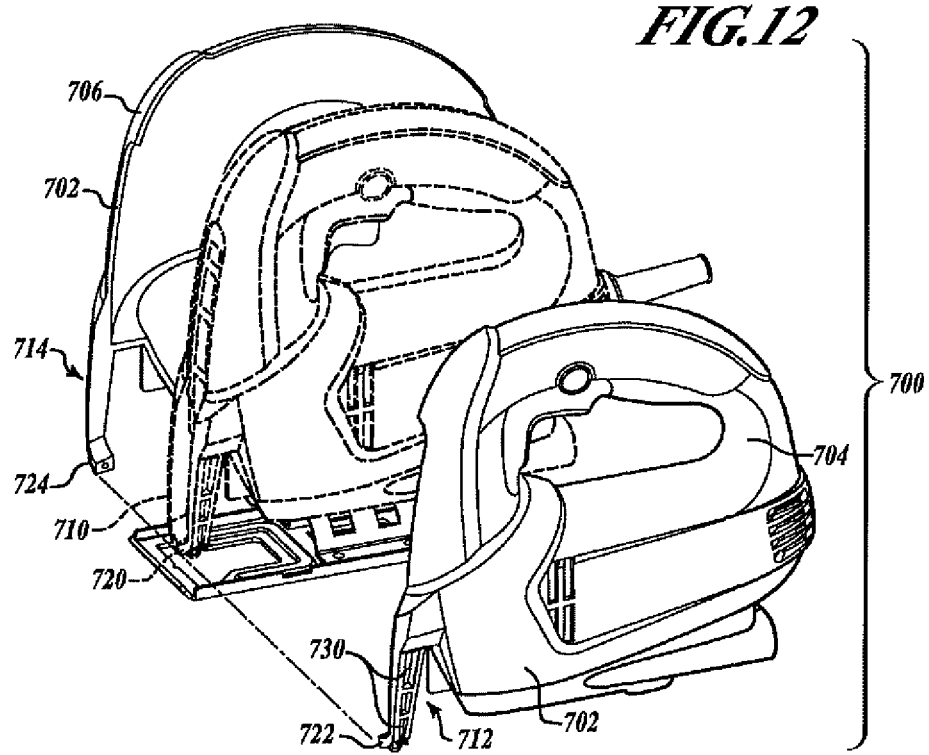
FIG. 12 is an exploded assembly view of a jigsaw having housing half shells and fascia half shells similar to the jigsaw of FIG. 1 having an integrally extending blade guard member from the fascia half shells in accordance with the present teachings.
Figure 13:
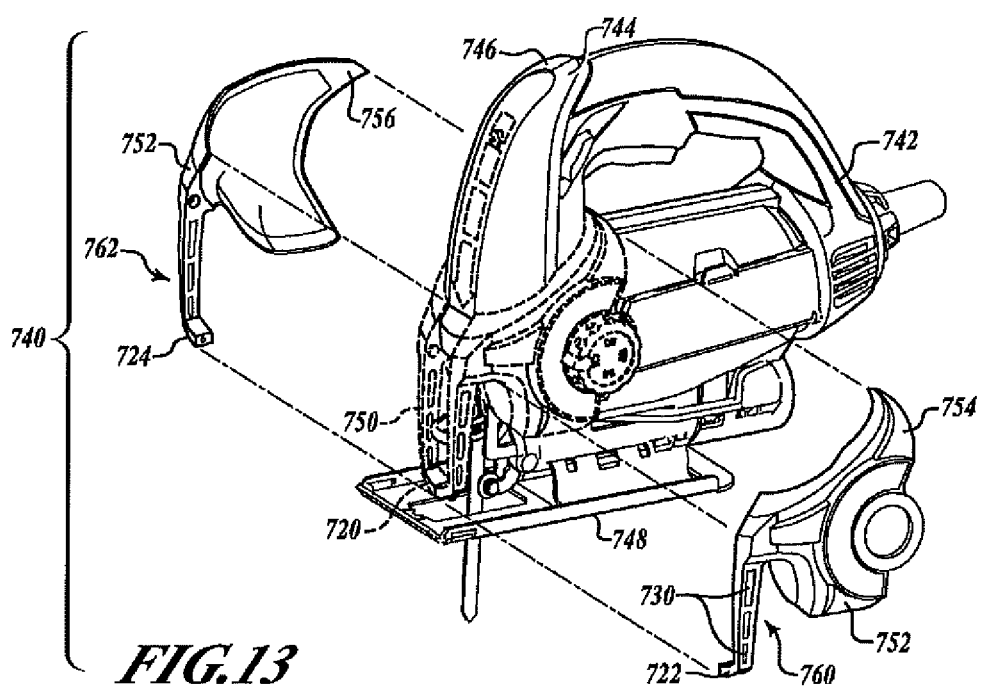
FIG. 13 is an exploded assembly view of a jigsaw having housing half shells similar to that of the jigsaw in FIG. 4 showing an integrally extending blade guard member from the housing half shells in accordance with the present teachings.

With reference to FIG. 12, a jigsaw 700 can have a housing 702 that can be formed of a right half shell 704 and a left half shell 706. The half shells 704, 706 can establish together, when assembled, a blade guard member 710 that can be, in some examples, an integral extension of the housing 702 of the jigsaw 700. With reference to FIG. 13, a jigsaw 740 can have a housing 742 formed of right half shell 744 and a left half shell 746. A shoe member 748 can pivotally connect to the housing 742. A blade guard member 750 can be an integral extension of a fascia member 752 that can be formed of a right fascia half shell 754 and a left fascia half shell 756. The blade guard member 710, 750 can provide, in some instances, protection from the cutting blade by preventing contact with it. By establishing the blade guard member 710 as the integral extension of the housing 702 or by establishing the blade guard member 750 as the integral extension of the fascia member 752, a separate multi-piece component separately fastened to the housing 702 can be avoided.

With reference to FIG. 12, the blade guard member 710 can include a right arm portion 712 that can extend from the right half shell 704. A left arm portion 714 can extend from the left half shell 706. With reference to FIG. 13, the blade guard member 750 can include a right arm portion 760 that can extend from the right fascia half shell 754. A left arm portion 762 can extend from the left fascia half shell 756.

With reference to FIGS. 12 and 13, the right arm portion 712, 760 and the left arm portion 714, 762 can each define a portion of a bottom portion 720 of the blade guard member 710, 750, i.e., a right bottom portion 722 and a left bottom portion 724. The right and left bottom portions 722, 724 of the blade guard member 710, 750 can unite in an abutting relationship to form the entirety of the bottom portion 720. The bottom portion 720 of the blade guard member 710, 750 can be fastened together and, in doing so, can be shown to improve the rigidity of the blade guard member 710, 750 and the housing 702 near the blade guard member 710, 750. In addition, the blade guard member 710, 750 can be configured with a plurality of apertures 730 so that a view through the blade guard member 710, 750 (e.g., toward the cutting area) can be improved for the user.

Figure 14:
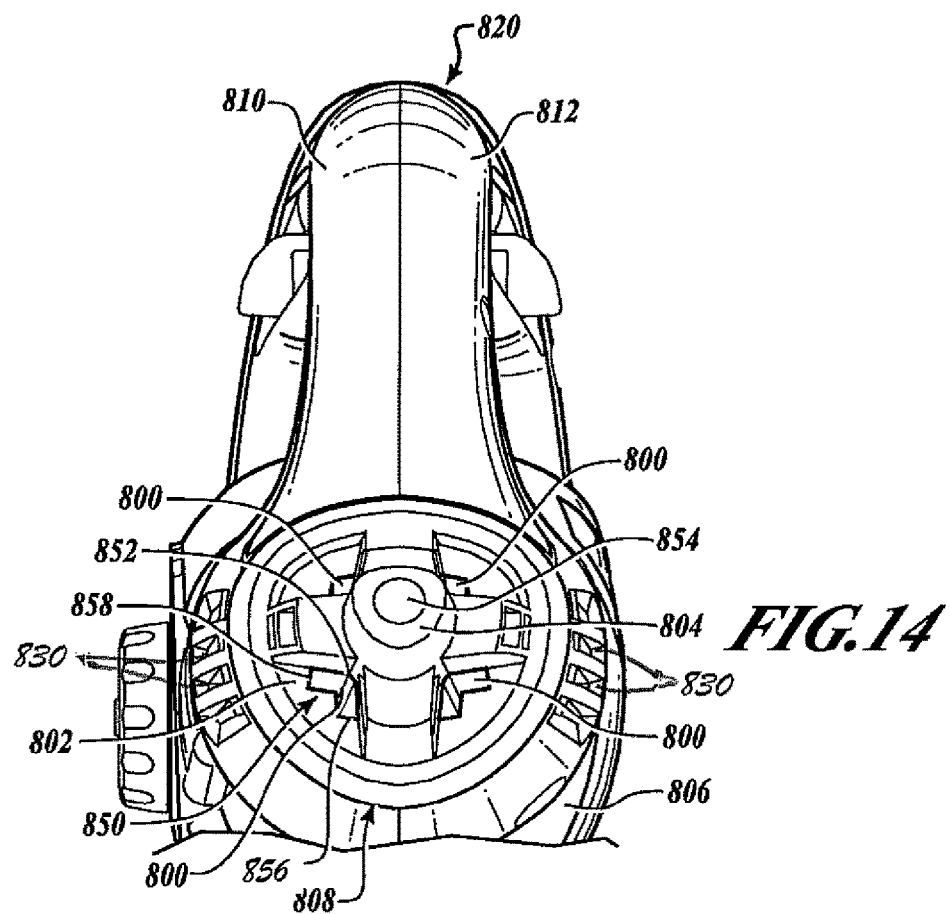
FIG. 14 is a partial rear view of the jigsaw housings of FIG. 1 showing the cooling passageways formed in a flexible member that also serves as a cord protector to provide additional cooling to a motor within a housing of the jigsaw in accordance with the present teachings.

With reference to FIG. 14, one or more cooling passageways 800 can be formed through a flexible member 802 that can also include a cord protector 804. The flexible member 802 can be contained between the housing 806 and specifically can be secured between an inner periphery 808 formed by the assembly of the housing half shells 810, 812.

The flexible member 802 can be a separately formed component that can be of a molded plastic which can be more flexible than the material used to form the half shells 810, 812 of the housing 806. The flexible member 802 can be held within the inner periphery 808 of the housing 806 with fasteners, bonding, etc. and/or with a portion of the housing 806 holding an outer periphery of the flexible member 802. Because the cord protector 804 can be flexible, the cord protector 804 can provide strain relief on the connection between the power source (i.e., a plug in a receptacle) of a cutting tool 820 and a motor 822 within the cutting tool 820.

Figure 15:
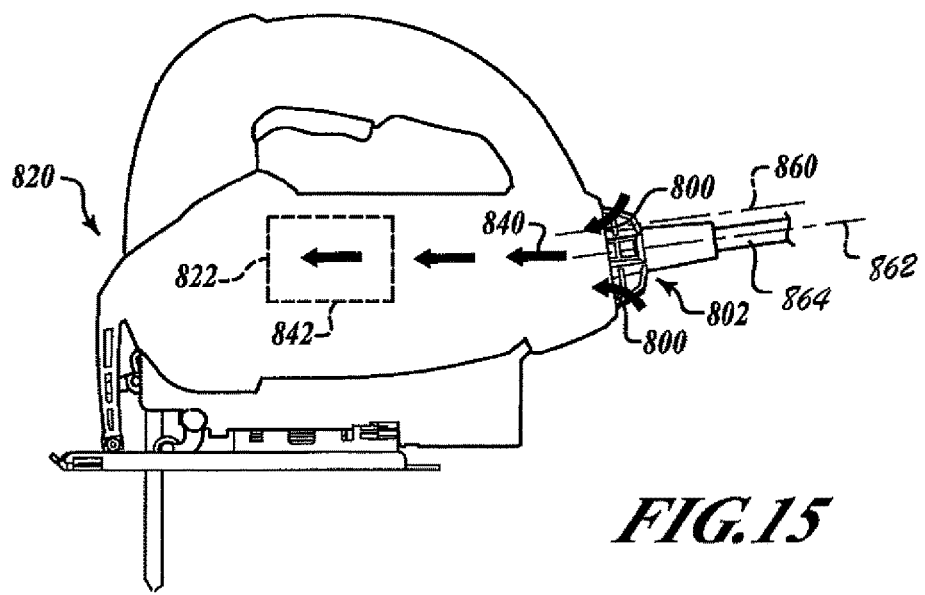
FIG. 15 is a diagram of a cross-sectional view of the jigsaw housing of FIG. 14 showing an airflow along a cooling pathway from the cooling passageways formed in the flexible member in accordance with the present teachings.

In addition to vents 830 formed on the housing 806, the one or more cooling passageways 800 formed in the flexible member 802 can increase the overall capacity of air capable of being drawn from the outside (i.e., outside the cutting tool 820) through portions of the housing 806 to cool the motor 822. With reference to FIG. 15, a cooling pathway 840 can start from the outside of the flexible member 802 and enter the one or more cooling passageways 800 formed therethrough. The cooling passageways 800 can continue through the housing 806 toward the motor 822. A fan 842 that rotates with the motor 822 can establish an airflow along the cooling pathway 840 such that cooling air is additionally drawn through the flexible member 802 to help cool the motor 822.

In one example, the flexible member 802 can be formed as a monolithic component that can include a passageway for the power cord, (i.e., strain relief). The monolithic component can also define the one or more cooling passageways 800 through which the cooling air can pass into the housing and cool the motor. In one example, there are four cooling passageways 800 formed in the flexible member 802. By way of the above example, the four cooling passageways 800 can generally be equally spaced around the cord protector 804.

One or more of the cooling passageways 800 can have an L-shape 850. A corner 852 established by the L-shape 850 can be closer to a passageway 854 (i.e., the cord protector 804) through which a power cord 864 can be disposed. The ends 856, 858 of the L-shape 850 distal from the corner 852 of the L-shape 850 can be closer to the power cord 864. Moreover, each of the cooling passageways can define a longitudinal axis 860 that can be generally parallel to a longitudinal axis 862 of a portion of the power cord 864 that is disposed in said cord protector 804.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. A jigsaw that uses cutting blades, the jigsaw comprising:
    a housing containing a motor activated by a trigger assembly;
    a blade storage compartment at least partially recessed in said housing;
    a platform provided in said blade storage compartment, said platform having a first edge that at least partially defines a first recess and a second recess that is adjacent to said first recess, said first recess and said second recess extend further into said housing beyond said platform;
    a member connected to said platform that produces a magnetic field that releasably secures a first cutting blade and a second cutting blade to said platform, wherein said magnetic field is configured to permit a user to tilt the first cutting blade about said first edge of said platform into said first recess to overcome said magnetic field and remove the first cutting blade from said storage compartment when the second cutting blade is secured to said platform.

2. The jigsaw of claim 1 further comprising a cover that when in a closed condition defines an outer surface that continues the general contours of the housing of the jigsaw around said cover.

3. The jigsaw of claim 1, wherein said magnetic field is configured to permit said user to tilt the second cutting blade about said first edge into said second recess to overcome said magnetic field and remove the second cutting blade from said storage compartment.

4. The jigsaw of claim 1 further comprising a third recess in said blade storage compartment defined by a second edge on said platform opposite said first edge and one of said first and second recesses.

5. The jigsaw of claim 1, wherein said member that produces said magnetic field is at least one magnet recessed in said platform and wherein the first cutting blade and the second cutting blade directly contacts said member.

6. The jigsaw of claim 1 further comprising a cover having a locking member deflectable by a hand operation between an engaged condition and a disengaged condition, in said engaged condition said locking member holds a portion of the blade storage compartment to secure said cover in a closed position, in said disengaged condition said locking member is deflected to permit opening of said cover.

7. The jigsaw of claim 1 further comprising a cover that opens and closes along an axis of rotation that is generally parallel to a cutting direction of the jigsaw.

8. The jigsaw of claim 7, wherein said cover in an open condition swings toward a shoe member so that said cover extends laterally from said blade storage compartment.

9. The jigsaw of claim 8, wherein said cover establishes a concave shape operable to hold an item that falls from said blade storage compartment.

10. The jigsaw of claim 1 further comprising a cover that can be secured to said blade storage compartment in a closed condition, wherein said cover is made of a material that at least partially permits a user to determine contents of said blade storage compartment.

11. The jigsaw of claim 1 further comprising
    a reciprocating shaft connected to said motor that extends through said housing toward a cutting area;
    a blade guard member that defines a left arm portion, a right arm portion and a base portion therebetween, wherein said blade guard member extends from said housing in front of said reciprocating shaft and toward said cutting area;
    a fascia connected to said housing, said fascia defining a left fascia half that connects to a left half shell of said housing and a right fascia half that connects to a right half shell of said housing, wherein said left arm portion of said blade guard member is an integral extension of said left fascia half and said right arm portion is an integral extension of said right fascia half; and said base portion being split into a left portion and a right portion, wherein said left portion of said base portion extends from said left arm portion of said blade guard member and said right portion of said base portion extends from said right arm portion of said blade guard member and wherein said left portion and said right portion of said base portion are fastened together in an abutting relationship.

12. The jigsaw of claim 1, further comprising a fan connected to said motor;

a flexible member disposed in said housing through which a power cord is disposed, wherein said flexible member is configured to permit said power cord and portions of said flexible member to flex relative to said housing; and at least one cooling passageway formed through said flexible member, wherein said fan establishes an airflow through said at least one cooling passageway, wherein said at least one cooling passageway extends through said flexible member along a longitudinal axis that is substantially parallel to a longitudinal axis of a portion of said power cord that extends through said flexible member.

13. A jigsaw for cutting a workpiece with a cutting blade, the jigsaw comprising:

a housing containing a motor activated by a trigger assembly, wherein said housing defines a left half shell and a right half shell;

a shoe member connected to said housing;

a reciprocating shaft connected to said motor that extends through said housing toward a cutting area, said reciprocating shaft operable to hold the cutting blade;

a blade guard member including a left arm portion, a right arm portion and a base portion therebetween, wherein said blade guard member extends from said housing in front of said reciprocating shaft and toward said cutting area to terminate proximate said shoe member;

said left arm portion extends from said left half shell;

said right arm portion extends from said right half shell; and said base portion being split into a left portion and a right portion, wherein said left portion of said base portion extends from said left arm portion of said blade guard member and said right portion of said base portion extends from said right arm portion of said blade guard member;

the jigsaw further comprising a blade storage compartment recessed in said housing;

a platform provided in said blade storage compartment having a first edge that at least partially defines a first recess that extends further into said housing beyond said platform; and a member connected to said platform that produces a magnetic field that releasably secures a cutting blade to said platform, wherein said magnetic field is configured to permit a user to tilt said cutting blade about said first edge into said first recess to overcome said magnetic field and remove said cutting blade from said storage compartment.

14. The jigsaw of claim 13, wherein said left arm portion is an integral extension of said left half shell and wherein said right arm portion is an integral extension of said right half shell.

15. The jigsaw of claim 13, wherein said left portion and said right portion of said base portion are fastened together in an abutting relationship.

16. The jigsaw of claim 13 further comprising a fascia member connected to said housing of the jigsaw, said fascia member defining a left fascia half shell that connects to said left half shell of said housing and a right fascia half shell that connects to said right half shell of said housing, wherein said left arm portion of said blade guard member is an integral extension of said left fascia half shell and said right arm portion is an integral extension of said right fascia half shell.

17. The jigsaw of claim 13, wherein said magnetic field is configured to permit said user to tilt a second cutting blade about said first edge into a second recess to overcome said magnetic field and remove the second cutting blade from said storage compartment, said second recess is adjacent said first recess and said first edge.

18. The jigsaw of claim 13, further comprising a third recess in said blade storage compartment defined by a second edge of said platform opposite said first edge and one of said first and second recesses.

19. The jigsaw of claim 13 further comprising a fan connected to said motor;

a flexible member disposed in said housing through which a power cord is disposed, wherein said flexible member is configured to permit said power cord and portions of said flexible member to flex relative to said housing; and at least one cooling passageway formed through said flexible member, wherein said fan establishes an airflow through said at least one cooling passageway, wherein said at least one cooling passageway extends through said flexible member along a longitudinal axis that is substantially parallel to a longitudinal axis of a portion of said power cord that extends through said flexible member.

20. The jigsaw of claim 19, wherein said housing defines an inner periphery between said left half shell and said right half shell of said housing and wherein said flexible member is secured to said housing in said inner periphery between said left half shell and said right half shell.

* * * * *